(12) United States Patent
Thiele et al.

(10) Patent No.: US 6,508,764 B1
(45) Date of Patent: Jan. 21, 2003

(54) ABERRATION CORRECTION APPARATUS AND METHODS

(75) Inventors: Karl E Thiele, Andover, MA (US); Bernard J Savord, Andover, MA (US)

(73) Assignee: Koninklijke Philips Electronics N.V., Eindhoven (NL)

(*) Notice: Subject to any disclaimer, the term of this patent is extended or adjusted under 35 U.S.C. 154(b) by 19 days.

(21) Appl. No.: 09/702,976

(22) Filed: Oct. 31, 2000

(51) Int. Cl.[7] .................................................. A61B 8/00
(52) U.S. Cl. ...................................... 600/437; 600/459
(58) Field of Search ................................. 600/443, 447, 600/454, 458, 459; 310/334, 336; 367/7, 11, 138; 128/916; 73/625, 626

(56) References Cited

U.S. PATENT DOCUMENTS

| | | |
|---|---|---|
| 5,111,823 A | 5/1992 | Cohen |
| 5,172,343 A | 12/1992 | O'Donnell |
| 5,331,964 A | 7/1994 | Trahey et al. |
| 5,357,962 A | 10/1994 | Green |
| 5,383,457 A | 1/1995 | Cohen |
| 5,388,461 A | 2/1995 | Rigby |
| 5,423,318 A | 6/1995 | Li et al. |
| 5,460,180 A | 10/1995 | Klepper et al. |
| 5,487,306 A | 1/1996 | Fortes |
| 5,517,995 A | 5/1996 | Klepper et al. |
| 5,531,117 A | 7/1996 | Fortes |
| 5,551,433 A | 9/1996 | Wright et al. |
| 5,566,675 A | 10/1996 | Li et al. |
| 5,570,691 A | 11/1996 | Wright et al. |
| 5,573,001 A | 11/1996 | Petrofsky et al. |
| 5,590,657 A | 1/1997 | Cain et al. |
| 5,605,154 A | 2/1997 | Ries et al. |
| 5,676,147 A | 10/1997 | Petrofsky et al. |
| 5,793,701 A | 8/1998 | Wright et al. |
| 5,935,068 A | 8/1999 | Zhu et al. |
| 5,935,072 A | 8/1999 | Hamilton et al. |
| 6,013,032 A | * 1/2000 | Savord ........................ 128/916 |
| 6,016,285 A | 1/2000 | Wright et al. |
| 6,023,977 A | 2/2000 | Langdon et al. |
| 6,027,447 A | 2/2000 | Li |

OTHER PUBLICATIONS

"Phase aberration correction signals from point reflectors and diffuse scatterers: Measurements"; O'Donnell; IEEE Transctions on Ultrasonics, Ferroelectrics, and Frequency Control; vol. 35, No. 1988; pp. 768–774.

"Phase aberration correction In medical ultrasound using speckle brightness as a quality factor"; by Nock, et al.; Journal of the Acoustic Society; May 1989; pp. 1819–1833.

"Correction of ultrasonic wavefront distortion using back-protection and a reference waveform method for time shift compensation"; by Liu et al.; Journal of the Acoustic Society; Aug. 1994; pp. 649–660.

"Direct estimation of aberrating delays in pulse–echo imaging systems"; by Rachlin; Journal of the Acoustic Society; Jul. 1990, pp. 191–198.

(List continued on next page.)

Primary Examiner—Marvin M. Lateef
Assistant Examiner—Ali M. Imam

(57) ABSTRACT

An ultrasound system and method for aberration correction processing in conjunction with finely pitched transducer elements and/or aberration correction processing in conjunction with a hierarchical control scheme. Results obtained from known aberration correction algorithms may be improved with the use of finely pitched transducer elements wherein the pitch of the elements (or subgroup of elements) is less than or equal to the wavelength of an ultrasound signal at the fundamental frequency. Elements of a transducer may be grouped into subgroups with aberration correction algorithms being applied to the output of each subgroup.

15 Claims, 4 Drawing Sheets

OTHER PUBLICATIONS

"Phase aberration correction using signals from point from point reflectors and diffuse scatterers: Basic principles"; by Flax, et al.; IEEE Transections on Ultrasonics, Ferroelectrics, and Frequency control; vol. 35. No. 6, Nov. 1988; pp. 758–767.

"Adaptive Compensation of phase and magnitude aberrations"; by Krishnan, IEEE Transactions on Ultrasonics, Ferroelectrics, and Frequency Control; vol. 43, No. 1, Jan. 1996; pp. 44–55.

"Real time corrections of beamforming time delay errors in abdominal ultrasound imaging", by K.W. Rigby; Medical Imaging 2000: Ultrasonic Imaging And Signal Processing; vo. 3982 (200); pp. 342–353.

"A speckle target adaptive imaging technique in the presence of distributed aberrations"; by Ng, et al.; IEEE Transactions on Ultrasonics, Ferroelectrics, and Frequency Control; vol. 44, No. 1, Jan. 1997, pp. 140–151.

"Deaberration of incoherent wavefront distortion: an approach toward inverse filtering"; by Zhu, et al; IEEE Transactions on Ultransonics, Ferroelectrics, and Frequency Control; vol. 44, No. 3, May 1997; pp. 575–589.

"Time reversal of ultrasonic fields—Part 1: Basic principles"; by Fink; IEEE Transactions on Ultrasonics, Ferroelctrics, and Frequency Control; vol. 39, No. 5, Sept. 1992; pp. 555–566.

* cited by examiner

ABERRATION CORRECTION APPARATUS AND METHODS

BACKGROUND OF THE INVENTION

The present invention relates to method and apparatus which perform aberration correction on signals output by an ultrasound transducer.

In calculating delays used to form and detect acoustic beams in ultrasound imaging, the velocity of sound is usually assumed constant. This greatly simplifies the calculations and generally provides a usable image. However, the velocity of ultrasound waves in body tissues is affected by the types of tissues through which the ultrasound waves pass. Passing ultrasound waves through a variety of tissue type causes sound velocity inhomogeneities, which in turn cause wavefront distortion, disrupting diffraction patterns and producing image artifacts.

Several approaches have been proposed to correct the effects of sound velocity inhomogeneities. One approach is to assume that the effect of the various tissues is similar to the effect of a simple phase screen at or near the face of the transducer (the so-called near field thin phase screen model). Using this assumption, sound velocity inhomogeneities can be modeled as time-of-flight errors (i.e., phase aberrations) and the received signal in one channel can be approximated by a time-delayed replica of the signal received by another channel. Thus, phase aberrations can be estimated (1) by determining the peak position in the cross-correlation of signals received by two adjacent channels or subarrays (S. W. Flax and M. O'Donnell, "Phase aberration correction using signals from point reflectors and diffuse scatterers: basic principles," IEEE Trans. Ultrason., Ferroelect. Freq. Contr., vol. 35, no. 6, pp. 758–767, 1988), or (2) by maximizing speckle brightness via time delay adjustment (L. F. Nock, G. E. Trahey, and S. W. Smith, "Phase aberration correction in medical ultrasound using speckle brightness as a quality factor," J. Acoust. Soc. Am., vol. 85, no. 5, pp. 1819–1833).

As with most assumptions, the near field thin phase screen model does not exactly capture the totality of distortions introduced by tissues in a body. See, for example: D. L. Liu and R. C. Waag, "Correction of ultrasonic wavefront distortion using backpropagation and a reference waveform method for time shift compensation," J. Acoust. Soc, Am., vol. 96, no. 2, pp. 649–660, 1994. It has been found that by modeling the thin phase screen at a distance away from the transducer, some additional waveform distortions can be somewhat corrected, however such models introduce distributed aberrations. Various methods have been proposed to correct for distributed aberrations (or displaced phase screens). They include a back propagation method (Liu, et al., supra), a total least squares (TLS) based approach called PARCA (S. Krishnan, P. C. Li, and M. O'Donnell, "Adaptive compensation of phase and magnitude aberrations," IEEE Trans. Ultrason., Ferroelect. Freq. Contr., vol. 43, no. 1, pp. 44–55, 1996), and a time reversal focusing technique (M. Fink, "Time reversal focusing in ultrasound: basic principles," IEEE Trans. Ultrason., Ferroelect. Freq. Contr., vol. 39, no. 5, Recently, other alternative approaches have been developed to correct distributed aberrations, including a phase conjugation approach (G. C. Ng, P. D. Freiburger, W. F. Walker, and G. E. Trahey, "A speckle target adaptive imaging technique in the presence of distributed aberrations," IEEE Trans. Ultrason., Ferroelect. Freq. Contr., vol. 44, no. 1, pp. 140–151, 1997), which independently corrects for time delay errors for each frequency component, and an inverse filtering approach (Q. Zhu and B. Steinberg, "Deaberration of incoherent wavefront distortion: an approach toward inverse filtering," IEEE Trans. Ultrason., Ferroelect. Freq. Contr., vol. 44, no. 3, pp. 575–589, 1997), which compensates for both phase and amplitude distortion in the frequency domain.

Wright U.S. Pat. No. 5,570,691 discloses an aberration correction value estimation system in which ultrasonic energy from a single firing or transmit event is used both in the formation of the ultrasonic image and in the calculation of aberration correction values. In this way, the need for separate aberration correction lines or frames can be eliminated.

Langdon et al. U.S. Pat. No. 6,023,977 discloses an ultrasonic imaging aberration correction system and method using a harmonic component of the fundamental transmitted frequency for aberration correction. The system selects the frequency bands of filters used in the image signal path and in the aberration correction path so that aberration correction values may be calculated concurrently with image formation.

The above referenced publications are representative of the work being done to provide real/time aberration correction. Unfortunately, while there have been many attempts at providing real-time aberration correction, none have resulted in a commercially viable system. In fact, when implemented, some of the above referenced methods produce images that are worse than un-corrected images. The most promising algorithms require tremendous computing power, placing systems out of reach of most buyers. For example, a recent GENERAL ELECTRIC system is referenced in an article entitled *Real-Time Correction of Beamforming Time Delay Errors in Abdominal Ultrasound Imaging* by K. W. Rigby published in *Medical Imaging 2000: Ultrasonic Imaging and Signal Processing* (Proceedings of SPIE Vol. 3982 (2000)). The system uses a small multi-row array (6×96 elements, not steerable in the elevation direction) linked to a specialized multi-processor array of 56 MOTOROLA processors to perform aberration correction and is estimated to cost upwards of $500,000.00. The cost to correct aberrations in a full size (56×56 elements), fully steerable 2-D array would be astronomical. Furthermore, the multi-row array is not steerable in the elevation direction.

The present inventors have recognized a need for an affordable aberration correction system that produces images better than pre-correction images. The present inventors have discovered methods and systems that enable the use of affordable processors to provide meaningful aberration correction by modifying known methods.

SUMMARY OF THE INVENTION

An ultrasound system and method for aberration correction processing in conjunction with finely pitched transducer elements and/or aberration correction processing in conjunction with a hierarchical control scheme. Results obtained from known aberration correction algorithms may be improved with the use of finely pitched transducer elements wherein the pitch of the elements (or subgroup of elements) is less than or equal to the wavelength of an ultrasound signal at the fundamental frequency. The fundamental frequency is approximately the center frequency of the transducer's wide-band response. Elements of a transducer may be grouped into subgroups with aberration correction algorithms being applied to the output of each subgroup.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
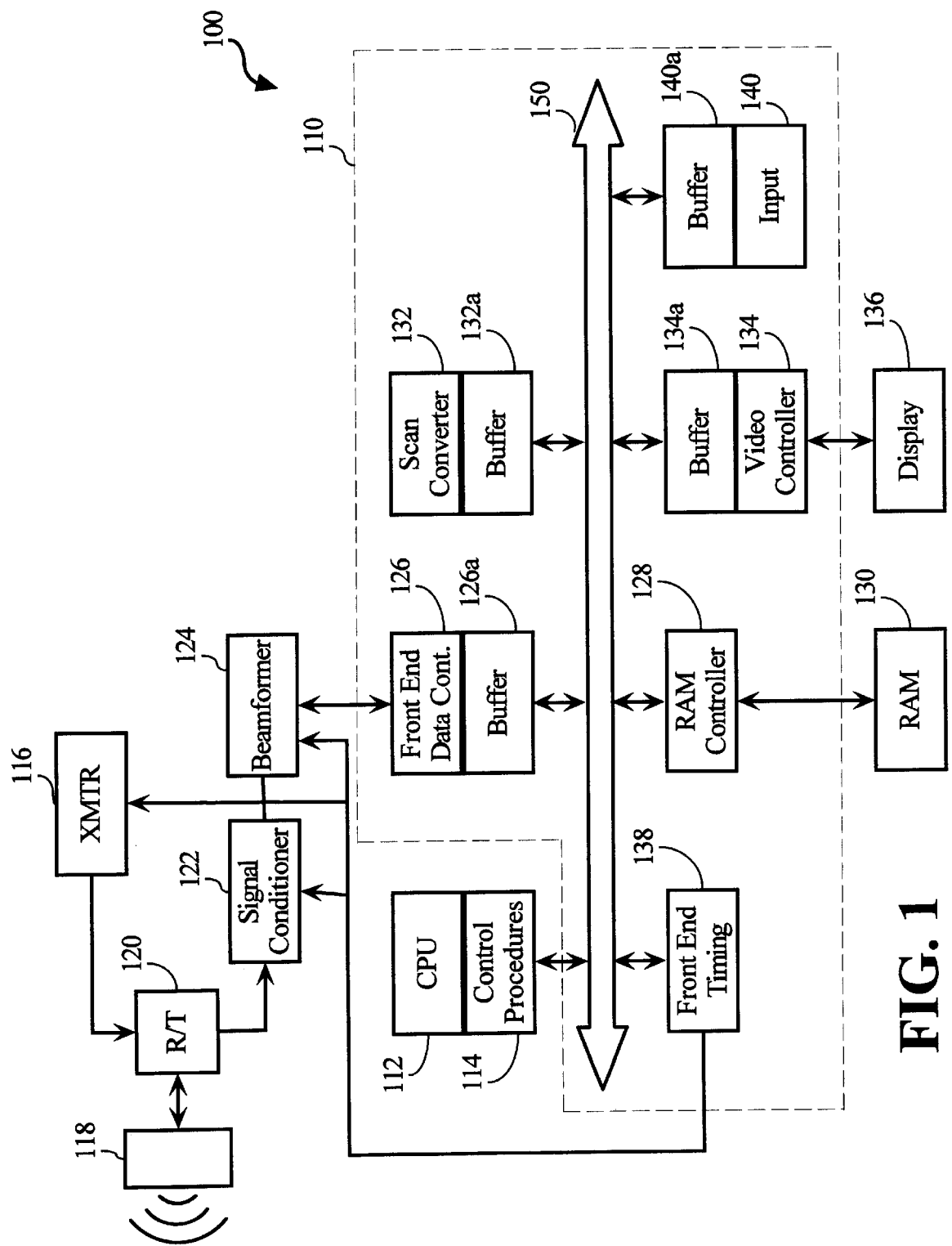
FIG. 1 is a block diagram of an ultrasound imaging system upon which the present invention can be practiced.

Reference will now be made in detail to the present preferred embodiments of the present invention, examples of which are illustrated in the accompanying drawings, wherein like reference numerals refer to like elements throughout.

The present invention utilizes aberration correction processing in conjunction with a 2-D array having finely pitched transducer elements and/or aberration correction processing in conjunction with a hierarchical control scheme for such a 2-D array.

The detailed description which follows is presented in terms of routines and symbolic representations of operations of data bits within a memory, associated processors, and possibly networks, and network devices. These descriptions and representations are the means used by those skilled in the art effectively convey the substance of their work to others skilled in the art. A routine is here, and generally, conceived to be a self-consistent sequence of steps or actions leading to a desired result. Thus, the term "routine" is generally used to refer to a series of operations performed by a processor, be it a central processing unit of an ultrasound system, or a secondary processing unit of such an ultrasound system, and as such, encompasses such terms of art as "program," "objects," "functions", "subroutines", and "procedures."

In general, the sequence of steps in the routines require physical manipulation of physical quantities. Usually, though not necessarily, these quantities take the form of electrical or magnetic signals capable of being stored, transferred, combined, compared or otherwise manipulated. Those of ordinary skill in the art conveniently refer to these signals as "bits", "values", "elements", "symbols", "characters", "images", "terms", "numbers", or the like. It should be recognized that these and similar terms are to be associated with the appropriate physical quantities and are merely convenient labels applied to these quantities.

In the present case, the routines and operations are machine operations to be performed in conjunction with human operators. Useful machines for performing the operations of the present invention include the Agilent Technologies SONOS 5500 and other similar devices. In general, the present invention relates to method steps, software, and associated hardware including computer readable medium, configured to store and/or process electrical or other physical signals to generate other desired physical signals.

The apparatus set forth in the present application is preferably specifically constructed for the required purpose, i.e. ultrasound imaging, but the methods recited herein may operate on a general purpose computer or other network device selectively activated or reconfigured by a routine stored in the computer and interface with the necessary ultrasound imaging equipment. The procedures presented herein are not inherently related to any particular ultrasonic system, computer or other apparatus. In particular, various machines may be used with routines in accordance with the teachings herein, or it may prove more convenient to construct more specialized apparatus to perform the required method steps. In certain circumstances, when it is desirable that a piece of hardware possess certain characteristics, these characteristics are described more fully in the following text. The required structures for a variety of these machines may appear in the description given below. Machines which may perform the functions of the present invention include those manufactured by such companies as AGILENT TECHNOLOGIES, as well as other manufacturers of ultrasound equipment.

FIG. 1 is a block diagram of an ultrasound imaging system upon which the present invention can be practiced. It will be appreciated by those of ordinary skill in the relevant arts that the ultrasound imaging system 100, as illustrated in FIG. 1, and the operation thereof as described hereinafter is intended to be generally representative such systems so as to provide a framework for detailed discussion of the present invention. Those of ordinary skill in the art will recognize the applicability of the present invention to a wide variety of ultrasound systems which may differ significantly from that shown in FIG. 1, particularly in the details of construction and operation of such system. As such, the ultrasound imaging system 100 is to be regarded as illustrative and exemplary and not limiting as regards the invention described herein or the claims attached hereto.

The ultrasound imaging system shown in FIG. 1 is configured for the use of pulse generator circuits, but could be equally configured for arbitrary waveform operation. The ultrasound system 100 utilizes a centralized bus architecture suitable for the incorporation of standard personal computer ("PC") type components. However, as stated above the present invention is applicable to a wide variety of ultrasound system, including those based on a more traditional custom component architecture.

The ultrasound system 100 includes a transducer 118 which, in a known manner, scans an ultrasound beam, based on a signal from a transmitter 116, through an angle. Backscattered signals, i.e. echoes, are sensed by the transducer 118 and fed, through a received/transmit switch 120, to a signal conditioner 122 and, in turn, to a beamformer 124.

The signal conditioner 122 receives the backscattered ultrasound analog signals and conditions those signals by amplification and forming circuitry prior to their being fed to the beamformer 124. Within the beamformer 124, the ultrasound signals are converted to digital values and are configured into "lines" of digital data values in accordance with amplitudes of the backscattered signals from points along an azimuth and an elevation of the ultrasound beam.

The beamformer 124 feeds the digital values to an application specific integrated circuit (ASIC) 110 which incorporates the principal processing modules required to convert the digital values into a form more conducive to video display for feed to a display 136.

A front end data controller 126, receives the lines of digital data values from the beamformer 124 and buffers each line, as received, in an area of a buffer 126a. After accumulating a line of digital data values, the front end data controller 126 dispatches an interrupt signal, via a bus 150, to a shared central processing unit (CPU) 112. The CPU 112 executes control procedures 114 including procedures that are operative to enable individual, asynchronous operation of each of the processing modules within the ASIC 110. More particularly, upon receiving the interrupt signal, the CPU 112 causes a line of digital data values data residing in the buffer 126a to be fed to a random access memory (RAM) controller 128 for storage in a random access memory (RAM) 130 which constitutes a unified, shared memory. RAM 130 stores instructions and data for the CPU 112, lines of RF digital data values and data being transferred between individual modules in the ASIC 130, all under control of the RAM controller 128.

A front end timing controller 138 is controlled by one of the control procedures 114 to output timing signals to the transmitter 116, the signal conditioner 122 and the beamformer 124 so as to synchronize their operations with the operations of the modules within ASIC 110. The front end timing controller 138 further issues timing signals which control the operation of the bus 150 and various other functions within the ASIC 110.

As aforesaid, the control procedures 114 configures the CPU 112 to enable the front end data controller 126 to move the lines of digital data values into the RAM controller 128 where they are then stored in RAM 130. Since the CPU 112 controls the transfer of lines of digital data values, it senses when an entire image frame has been stored in RAM 130. At this point, the CPU 112, as configured by the control procedures 114, recognizes that data is now available for operation by a scan converter 132, at which point, the CPU 112 notifies the scan converter 132 that it can access the frame of data from RAM 130 for processing.

To access the data in RAM 130 (via RAM controller 128), the scan converter 132 interrupts the CPU 112 to request a line of the data frame from RAM 130. Such data is then transferred to a buffer 132a of the scan converter 132, and is transformed into a displayable data. This process is repeated for each subsequent line of digital data values of the image frame from RAM 130. The resulting processed data is fed, via the RAM controller 128, into RAM 130 as video-ready data. The video ready data is stored separately from the data produced by the beamformer 124. The CPU 112 and the control procedures 114, via the interrupt procedure described above, sense the completion of the operation of the scan converter 132. A video controller 134, on a continuing basis, interrupts the CPU 112 which responds by causing a feed of lines of video data thereto from RAM 130 into a buffer 134a associated with the video controller 134. The video controller 134 uses the video data to create an image on the display 136.

An input unit 140 provides an operator interface using a combination of input devices, such as keys, sliders, switches, touch screens and track balls, via a buffer 140a.

In accordance with the first preferred embodiment of the present invention, the transducer 118 includes elements, preferably configured as a 56×56 element steerable two-dimensional array, but in any event having a pitch (the distance between the centers of subsequent element) in both the lateral and elevation direction (x and y) less than or equal to the wavelength of the fundamental frequency and preferably less than or equal to half the wavelength of the fundamental frequency. Thus, at a fundamental frequency of 2.5 MHz, using the speed of sound in water (1540 M/sec), the pitch should be less than 0.616 mm. Conversely, the GE system described above has a 1.5 mm or 2.5 mm pitch in the elevation direction and a 0.6 mm pitch in the lateral direction with a 3.35 MHz fundamental frequency.

In accordance with the first preferred embodiment of the present invention, the beamformer 124 incorporates an aberration correction process. The aberration correction process can be any of the previously described methods. The present inventor have discovered that prior arbitration correction efforts failed mainly due to the varying effects of aberration over the surface of the transducer elements. By using elements having a limited pitch, the present invention can reduce the effect of aberrations over the surface of the elements. The integration of aberration processing with a beamformer is discussed herein below with respect to FIG. 3.

Figure 2:
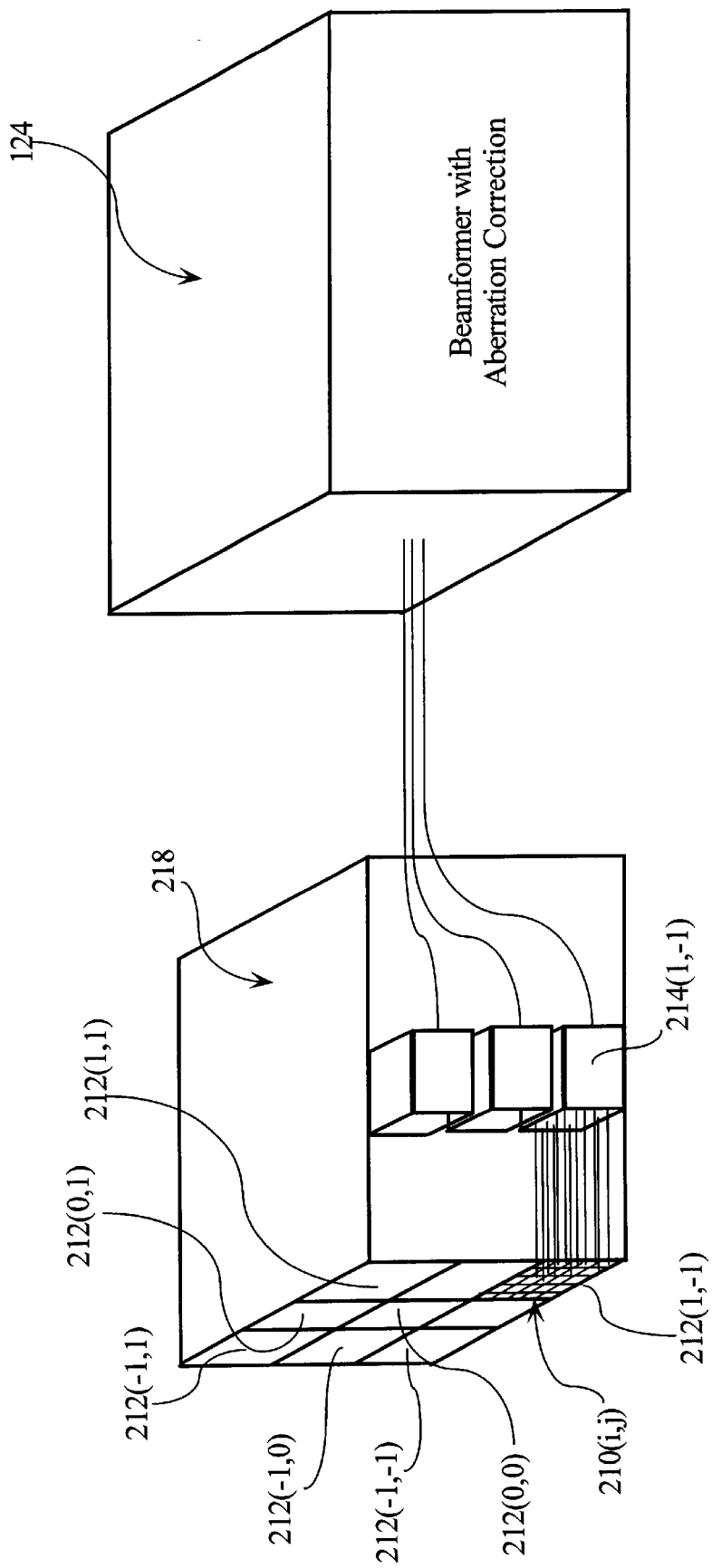
FIG. 2 is a diagram of a transducer in accordance with a second preferred embodiment of the present invention.

FIG. 2 is a diagram of a transducer in accordance with a second preferred embodiment of the present invention. Generally, a transducer 218 interacts with a beamformer 224 to transmit and receive data. Those of ordinary skill in the art will recognize that the interaction between the beamformer 224 and the transducer 218 takes place via a variety of circuits/signal paths, the exact configuration of which depends on the architecture of the ultrasound system utilized. While one example is shown in FIG. 1, it will be recognized that the present invention can be adapted for use on a variety of architectures.

In accordance with the second preferred embodiment, the transducer 218 is a 2-D transducer comprising a plurality of elements 210 arranged in a two dimensional matrix. In FIG. 2 (ij) notation is used to identify each element. To simplify control, the elements 210 are divided into sub-groups 212. In FIG. 2 (x,y) notation is used to identify each element. While, nine (9) sub-groups are shown, those of ordinary skill in the art will recognize that the exact number of sub-groups utilized is a design decision. In perhaps the preferred configuration, 128 sub-groups are defined with 25 elements each, for a total of 3200 elements. Referring once again to FIG. 2, each sub-group is connected to a sub-group beamforming element 214. Once again (x,y) notation is used to identify each sub-group beamforming element 214. Each of the sub-group beamforming elements 214 (x,y) are connected to the beamformer 224.

The general operation of the transducer 218 and beamformer 224 combination, sans aberration correction, is described in U.S. Pat. No. 6,126,602, 6,013,032, and 5,997,479 assigned to the assignee of the present application: AGILENT TECHNOLOGIES, INC., incorporated herein by reference. Accordingly, only the briefest description will be presented herein.

Basically, each sub-group beamforming element 214 (x,y) is responsible for delaying the input of each of the elements 210 (i,j) in the connected subgroup 212 (x,y). These delayed inputs are then summed to produce a single output signal. The beamformer 224 receives the output signal of each of the sub-group beamforming elements 214 (x,y), delays each signal and sums the delayed signals to produce a single output signal.

Such a hierarchical configuration allows precise control over a multitude of elements while reducing the number of leads (from over 3000 to 128) required to connect the transducer 118 to the main portion of the ultrasound system. The second embodiment of the present invention utilizes the hierarchical configuration to allow aberration correction algorithms to be applied to each subgroup (as opposed to each element), thereby reducing the required processing resources. This allows aberration correction algorithms to be utilized which would otherwise be avoided due to processing requirements. Further, as the array of sub-groups preferably has a pitch approximately less than or equal to the wavelength of the fundamental frequency, improved aberration correction results are achieved in accordance with the first preferred embodiment of the present invention.

Figure 3:
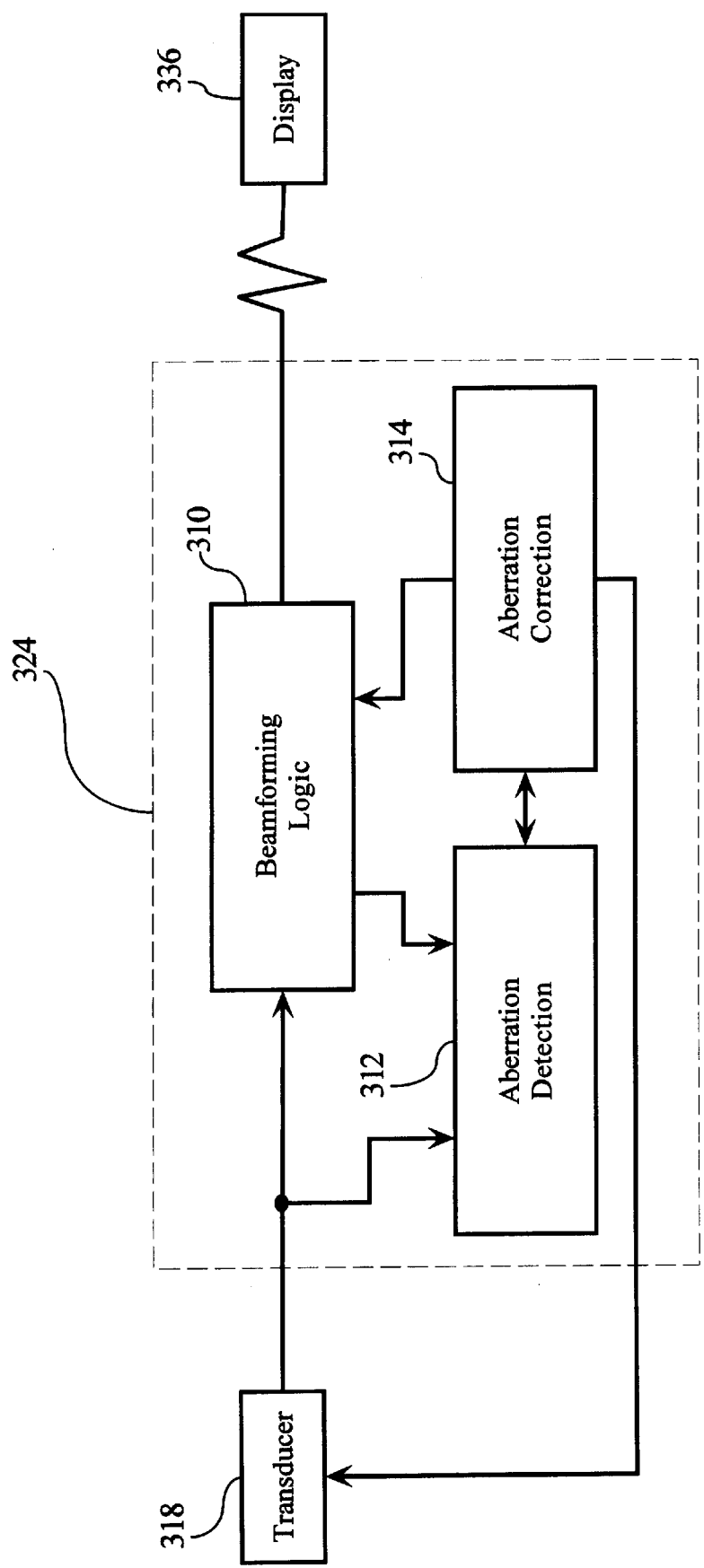
FIG. 3 is a diagram of a beamformer in accordance with the preferred embodiments of the present invention.

FIG. 3 is a diagram of a beamformer in accordance with the preferred embodiments of the present invention. The beamformer 324 generally comprises beamforming logic 310, an aberration detection unit 312 and an aberration correction unit 314. The beamformer 324, general speaking, receives data from a transducer 318 (for example, the transducer 118 or transducer 218) and outputs data for display on a display 336 (such as the display 136). In the case of a transducer configured as in FIG. 2, the aberration detection unit 312 analyzes the signals from each of the subgroups 212 in the transducer 218 using known algorithms. Several methods for the detection and compensation of aberrations are known to those of ordinary skill in the art. One such example is given in U.S. Pat. No. 6,023,977. However, most attempts at aberration correction have focused on 1-D arrays. The present inventors have recognized that the known methods of aberration correction on traditional 1-D arrays suffer because of the relative dimensions (quite long in the vertical direction) of the elements on such a 1-D array. These known methods operate on an element by element basis or sub-array basis (on 1-D arrays) and compare certain parameters of the elements or subarrays and calculate correction values to be applied to future signals. Such methods can be adapted to the transducer 218 by treating each row of sub-groups as a 1-D array. If desired, comparisons can also be made vertically to increase the effectiveness of the correction factors. Additional benefit may be gained using interpolation at the element level.

Figure 4:
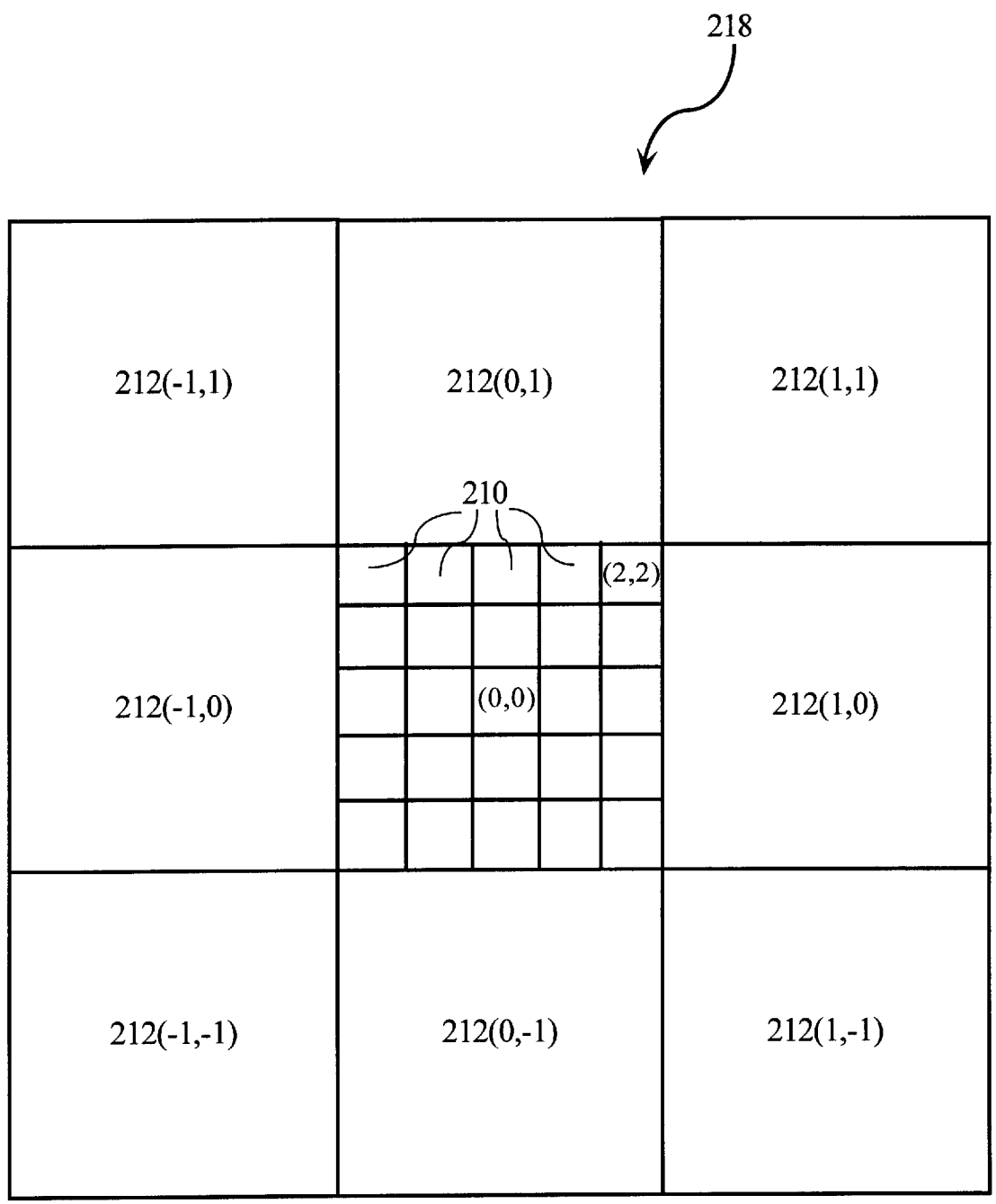
FIG. 4 is a conceptual view of a transducer in accordance with the second preferred embodiment of the present invention

FIG. 4 is a conceptual view of a transducer in accordance with the second preferred embodiment of the present invention. FIG. 4 shows a sample layout for a transducer 218 with nine (9) subgroups of twenty-five (25) elements each. Subgroup 212 (0,0) is shown in detail. If more aberration correction resolution is desired than that offered by the subgroup, the subgroup beamformer 214 can apply an interpolated correction factor to each element. A simple interpolation formula for use by the subgroup beamformer 214 (0,0) is shown in equation 1:

$$\text{Correction Factor} = \alpha A + \beta B + \gamma C + \delta D + \epsilon E + \zeta F + \eta G + \theta H + \iota I \quad \text{EQUATION 1:}$$

Where A=the aberration correction factor for subgroup 212 (−1,1);
  B=the aberration correction factor for subgroup 212 (0,1);
  C=the aberration correction factor for subgroup 212 (1,1);
  D=the aberration correction factor for subgroup 212 (−1,0);
  E=the aberration correction factor for subgroup 212 (0,0);
  F=the aberration correction factor for subgroup 212 (1,0);
  G=the aberration correction factor for subgroup 212 (−1,−1);
  H=the aberration correction factor for subgroup 212 (0,−1);
  I=the aberration correction factor for subgroup 212 (1,−1); and
  where $\alpha$, $\beta$, $\gamma$, $\delta$, $\epsilon$, $\zeta$, $\eta$, $\theta$, and $\iota$ are Interpolation Coefficients based upon the distance of element 210 (i,j) to the element 210 (0,0) of the corresponding subgroup 212.

The Interpolation Coefficients can be stored in a memory associated with the subgroup beamformer 214 or calculated interactively. Either way, the processing resources to interpolate aberration coefficients is far less than that required to calculate actual aberration correction factors for each element.

In accordance with the foregoing, the present inventors have described apparatus and methods for improved aberration correction using appropriately sized transducer elements and/or applying aberration correction values to subgroups in a two dimensional array with or without element by element interpolation. This represents a significant advance over the prior art which applies aberration correction to large elements in a 1-D array and /or requires extreme processing resources to calculate aberration correction values for each element in a relatively small multi-row Array.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:
1. An ultrasound system comprising:
   a transducer having:
      a two dimensional array of elements, each element outputting a data signal in response to impinging ultrasound waves; and
      a plurality of sub-group beamforming elements, each sub-group beamforming element delaying and combining the data signal from a number of elements;
   a beamformer logic unit that delays and combines the output of each of the sub-group beamforming elements;
   an aberration detection unit that detects aberrations in the output of each of the sub-group beamforming elements; and
   an aberration correction unit that, in response to the aberration detection unit, calculates a correction factor for each of the sub-group beamforming elements that reduces the effect of the aberration on the output of that sub-group beamforming element.

2. An ultrasound system, as set forth in claim 1, wherein the correction factor calculated by the aberration correction unit is used to adjust the amplitude of the data signal.

3. An ultrasound system, as set forth in claim 1, wherein the correction factor calculated by the aberration correction unit is used to adjust the phase of the data signal.

4. An ultrasound system, as set forth in claim 1, wherein the correction factor calculated by the aberration correction unit is used to adjust the delay applied to the data signal.

5. An ultrasound system, as set forth in claim 1, wherein the aberration correction unit calculates the correction factor for each element by interpolation using the correction factor for surrounding sub-group beamforming elements.

6. An ultrasound system, as set forth in claim 1, wherein the sub-group beamforming elements have a pitch that is less than or equal to the wavelength of an ultrasound signal at the fundamental frequency.

7. An ultrasound system, as set forth in claim 1, wherein the correction factor is applied by the beamforming logic unit.

8. An ultrasound system, as set forth in claim 1, further comprising:
   a transmit circuit that outputs timed signals to the two dimensional array of elements causing them to emit ultrasound signals; and
   wherein the correction factor is applied by a transmit circuit.

9. An ultrasound system, as set forth in claim 8, wherein the correction factor is applied by the beamforming logic unit.

10. An ultrasound system comprising:
a transducer having a plurality of elements arranged in a 2-dimensional array wherein the pitch of the elements is less than or equal to the wavelength of an ultrasound signal at the fundamental frequency;
a receive beamformer that appropriately delays signals from the plurality of elements to produce ultrasound data; and
an aberration correction circuit that analyzes the signals from the plurality of elements and adjusts the operation of the beamformer so as to reduce the effect of aberrations on the ultrasound data.

11. An ultrasound system comprising:
a transducer having:
  a two dimensional array of elements, each element outputting a data signal in response to impinging ultrasound waves; and
  a plurality of sub-group beamforming elements, each sub-group beamforming element delaying and combining the data signal from a number of elements, the sub-group beamforming elements having a pitch less than or equal to the wavelength of an ultrasound signal at the fundamental frequency;
a beamformer logic unit that delays and combines the output of each of the sub-group beamforming elements;
an aberration unit that calculates a correction factor for each of the sub-group beamforming elements that reduces the effect of aberrations on the output of that sub-group beamforming element.

12. A method of compensating for aberrations in an ultrasound system, the method comprising:
grouping elements of a transducer into subgroups;
detecting aberration in the signals output by each subgroup; and
compensating for aberrations in the signals output by each subgroup;
wherein the step of compensating comprises:
  generating a compensation value for each subgroup;
  interpolating a compensation value for each element in a subgroup;
  using the interpolated compensation values to adjust a signal derived from the output of each element.

13. An ultrasound system comprising:
a transducer having a two dimensional array of elements, each element outputting a data signal in response to impinging ultrasound waves wherein the elevation and lateral pitch of the elements is less than or equal to the wavelength of the fundamental frequency of the transducer;
a beamformer logic unit that delays and combines the output of each of the elements;
an aberration detection unit that detects aberrations in the output of the elements; and
an aberration correction unit that, in response to the aberration detection unit, calculates a correction factor for the elements that reduces the effect of the aberration on the output of that element.

14. An ultrasound system, as set forth in claim 13, wherein the elevation and lateral pitch of the elements is less than or equal to half of the wavelength of the fundamental frequency of the transducer.

15. An ultrasound system, as set forth in claim 13, wherein the transducer is steerable in the azimuth and elevation directions.

* * * * *